(12) United States Patent
Bhise et al.

(10) Patent No.: US 9,501,582 B2
(45) Date of Patent: Nov. 22, 2016

(54) PROVIDING TEXT CONTENT EMBEDDED WITH PROTECTED MULTIMEDIA CONTENT

(75) Inventors: Mohar H. Bhise, Bellevue, WA (US); Timothy M. Garcia, Seattle, WA (US); Martin Goerner, Meudon (FR); Brandon J. Smith, Seattle, WA (US); Ryan J. Snodgrass, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 1247 days.

(21) Appl. No.: 12/828,011

(22) Filed: Jun. 30, 2010

(65) Prior Publication Data

US 2011/0276863 A1 Nov. 10, 2011

Related U.S. Application Data

(60) Provisional application No. 61/333,207, filed on May 10, 2010.

(51) Int. Cl.
*G06F 17/00* (2006.01)
*G06F 17/30* (2006.01)
(Continued)

(52) U.S. Cl.
CPC ....... *G06F 17/30905* (2013.01); *G06F 3/0483* (2013.01); *G06F 17/2247* (2013.01); *G06F 17/30011* (2013.01); *G06F 21/10* (2013.01); *G06F 21/64* (2013.01)

(58) Field of Classification Search
CPC ........... G06F 17/2247; G06F 17/3089; G06F 17/30905; G06F 17/24; G06F 17/211; G06F 17/30899; G06F 21/10; G06F 21/31; G06F 21/60; G06F 2221/2115; G06F 2121/2137; G06F 3/0483; G06F 17/30011; G06F 21/64; H04L 2463/101; H04L 2463/10; H04L 67/02; H04L 63/10
USPC ................ 715/200–203, 205–206, 210, 234, 715/238–239, 248–249, 252–253, 255, 273, 715/276, 762, 776, 757; 726/4, 26–27, 30; 709/206, 217–219, 223, 227, 229, 248; 705/51, 59; 345/156, 173, 901
See application file for complete search history.

(56) References Cited

U.S. PATENT DOCUMENTS 5,455,945 A 10/1995 VanderDrift
5,524,201 A 6/1996 Shwarts et al.
(Continued)

OTHER PUBLICATIONS

Office action for U.S. Appl. No. 12/060,114, mailed on Aug. 10, 2011, Ryan et al., "Dynamically Populating Electronic Item", 32 pages.
(Continued)

*Primary Examiner* — Cesar Paula
*Assistant Examiner* — James H Blackwell
(74) *Attorney, Agent, or Firm* — Lee & Hayes, PLLC

(57) ABSTRACT

Text content embedded with multimedia content is provided from a content provider to a client device. The multimedia content may be provided to the client device separate from the text content. In particular, multimedia content metadata indicating a storage location of the multimedia content may be provided to the client device after the text content. The client device may request the multimedia content from the content provider based on the multimedia content metadata. The content provider may send the requested multimedia content to the client device after receiving an authenticated version of the multimedia content metadata.

19 Claims, 8 Drawing Sheets

(51) Int. Cl.
*G06F 21/10* (2013.01)
*G06F 3/0483* (2013.01)
*G06F 21/64* (2013.01)
*G06F 17/22* (2006.01)

(56) References Cited

U.S. PATENT DOCUMENTS

| | | | |
|---|---|---|---|
| 5,566,098 A | 10/1996 | Lucente et al. | |
| 5,631,984 A | 5/1997 | Graf et al. | |
| 5,663,748 A | 9/1997 | Huffman et al. | |
| 5,745,360 A | 4/1998 | Leone et al. | |
| 5,799,157 A | 8/1998 | Escallon | |
| 5,802,292 A * | 9/1998 | Mogul | 709/203 |
| 5,847,698 A | 12/1998 | Reavey et al. | |
| 5,937,158 A | 8/1999 | Uranaka | |
| 6,082,776 A | 7/2000 | Feinberg | |
| 6,173,406 B1 * | 1/2001 | Wang et al. | 726/3 |
| 6,289,510 B1 | 9/2001 | Nakajima | |
| 6,363,418 B1 * | 3/2002 | Conboy et al. | 709/218 |
| 6,415,307 B2 * | 7/2002 | Jones et al. | 715/202 |
| 6,496,803 B1 | 12/2002 | Seet et al. | |
| 6,633,877 B1 | 10/2003 | Saigh et al. | |
| 6,697,948 B1 | 2/2004 | Rabin et al. | |
| 6,766,362 B1 | 7/2004 | Miyasaka et al. | |
| 6,857,102 B1 * | 2/2005 | Bickmore et al. | 715/205 |
| 6,990,489 B2 | 1/2006 | Kondo et al. | |
| 7,009,596 B2 | 3/2006 | Seet et al. | |
| 7,298,851 B1 | 11/2007 | Hendricks et al. | |
| 7,304,635 B2 | 12/2007 | Seet et al. | |
| 7,669,121 B2 * | 2/2010 | Kiilerich | 715/249 |
| 7,886,226 B1 | 2/2011 | McCoy et al. | |
| 7,925,990 B2 | 4/2011 | Bedingfield, Sr. | |
| 7,996,882 B2 * | 8/2011 | L'Heureux et al. | 726/4 |
| 8,346,660 B2 * | 1/2013 | Reardon et al. | 705/39 |
| 2001/0016851 A1 * | 8/2001 | Gramsamer et al. | 707/200 |
| 2001/0049635 A1 | 12/2001 | Chung | |
| 2002/0034296 A1 | 3/2002 | Yoshimune et al. | |
| 2002/0035697 A1 | 3/2002 | McCurdy et al. | |
| 2002/0077985 A1 | 6/2002 | Kobata et al. | |
| 2002/0090934 A1 | 7/2002 | Mitchelmore | |
| 2002/0095538 A1 | 7/2002 | Marshall | |
| 2002/0099763 A1 | 7/2002 | Kondo et al. | |
| 2002/0133464 A1 | 9/2002 | Ress et al. | |
| 2002/0138520 A1 | 9/2002 | Wakai et al. | |
| 2002/0143822 A1 | 10/2002 | Brid et al. | |
| 2002/0152245 A1 | 10/2002 | McCaskey et al. | |
| 2002/0152257 A1 | 10/2002 | Frolik et al. | |
| 2002/0169700 A1 | 11/2002 | Huffman et al. | |
| 2002/0174145 A1 | 11/2002 | Duga et al. | |
| 2002/0194309 A1 * | 12/2002 | Carter et al. | 709/219 |
| 2003/0018663 A1 | 1/2003 | Cornette et al. | |
| 2003/0061101 A1 | 3/2003 | Seet et al. | |
| 2003/0069812 A1 | 4/2003 | Yuen et al. | |
| 2003/0093336 A1 | 5/2003 | Ukita et al. | |
| 2003/0093382 A1 * | 5/2003 | Himeno et al. | 705/51 |
| 2003/0140093 A1 * | 7/2003 | Factor | H04L 29/06027 709/203 |
| 2003/0149618 A1 | 8/2003 | Sender et al. | |
| 2003/0182231 A1 | 9/2003 | Koike et al. | |
| 2003/0236917 A1 | 12/2003 | Gibbs et al. | |
| 2004/0001087 A1 | 1/2004 | Warmus et al. | |
| 2004/0015608 A1 | 1/2004 | Ellis et al. | |
| 2004/0054915 A1 * | 3/2004 | Jong et al. | 713/193 |
| 2004/0078453 A1 * | 4/2004 | Bhogal et al. | 709/219 |
| 2004/0093279 A1 | 5/2004 | Yamanoue et al. | |
| 2004/0098284 A1 | 5/2004 | Petito et al. | |
| 2004/0125140 A1 | 7/2004 | Bell et al. | |
| 2004/0139400 A1 | 7/2004 | Allam et al. | |
| 2004/0140975 A1 | 7/2004 | Saito et al. | |
| 2004/0153422 A1 | 8/2004 | Sakamura et al. | |
| 2004/0254851 A1 | 12/2004 | Himeno et al. | |
| 2005/0012723 A1 | 1/2005 | Pallakoff | |
| 2005/0027671 A1 * | 2/2005 | Hind et al. | 707/1 |
| 2005/0091672 A1 | 4/2005 | Debique et al. | |
| 2005/0138139 A1 | 6/2005 | Jain et al. | |
| 2005/0188228 A1 * | 8/2005 | DeMello et al. | 713/201 |
| 2005/0246451 A1 | 11/2005 | Silverman et al. | |
| 2006/0015508 A1 | 1/2006 | Kondo et al. | |
| 2006/0036488 A1 | 2/2006 | Golan et al. | |
| 2006/0050996 A1 | 3/2006 | King et al. | |
| 2006/0161538 A1 * | 7/2006 | Kiilerich | 707/4 |
| 2006/0184566 A1 | 8/2006 | Lo et al. | |
| 2006/0184639 A1 * | 8/2006 | Chua et al. | 709/217 |
| 2006/0281058 A1 | 12/2006 | Mangoaela | |
| 2007/0005616 A1 | 1/2007 | Hay et al. | |
| 2007/0027887 A1 | 2/2007 | Baldwin | |
| 2007/0053246 A1 | 3/2007 | Sano et al. | |
| 2007/0074109 A1 | 3/2007 | Nagahara et al. | |
| 2007/0118556 A1 | 5/2007 | Arnold et al. | |
| 2007/0118606 A1 | 5/2007 | Duncan et al. | |
| 2007/0124671 A1 | 5/2007 | Hackworth et al. | |
| 2007/0124781 A1 | 5/2007 | Casey et al. | |
| 2007/0136337 A1 | 6/2007 | Sah et al. | |
| 2007/0146812 A1 | 6/2007 | Lawton | |
| 2007/0154876 A1 | 7/2007 | Harrison, Jr. | |
| 2007/0201093 A1 | 8/2007 | Johnson et al. | |
| 2007/0260671 A1 | 11/2007 | Harinstein et al. | |
| 2008/0005263 A1 | 1/2008 | Baraev et al. | |
| 2008/0007486 A1 | 1/2008 | Fujinawa et al. | |
| 2008/0015933 A1 | 1/2008 | McKenna et al. | |
| 2008/0071561 A1 | 3/2008 | Holcombe | |
| 2008/0082911 A1 | 4/2008 | Sorotokin et al. | |
| 2008/0091796 A1 | 4/2008 | Story et al. | |
| 2008/0120185 A1 | 5/2008 | Evans | |
| 2008/0180401 A1 | 7/2008 | Khedouri et al. | |
| 2008/0183541 A1 | 7/2008 | Wenger et al. | |
| 2008/0189608 A1 | 8/2008 | Nurmi | |
| 2008/0270909 A1 * | 10/2008 | Kaufman et al. | 715/738 |
| 2009/0043755 A1 | 2/2009 | Faris et al. | |
| 2009/0064184 A1 | 3/2009 | Chacko et al. | |
| 2009/0094018 A1 | 4/2009 | Hu et al. | |
| 2009/0187846 A1 | 7/2009 | Paasovaara | |

OTHER PUBLICATIONS

The PCT Search Report and Written Opinion mailed Aug. 12, 2011 for PCT application No. PCT/US11/35853, 8 pages.
Final Office Action for U.S. Appl. No. 12/060,114, mailed on Jan. 19, 2012, Thomas A. Ryan et al., "Dynamically Populating Electronic Item", 73 pages.
Office action for U.S. Appl. No. 12/060,114, mailed on Mar. 4, 2013, Ryan, "Dynamically Populating Electronic Item", 53 pages.
Final Office Action for U.S. Appl. No. 12/060,167, mailed on Aug. 17, 2012, Steven K. Weiss et al., "Dynamic Display Dependent Markup Language Interface", 11 pages.
U.S. Appl. No. 12/060,167, filed Mar. 31, 2008, Steven K. Weiss et al., "Dynamic Display Dependent Markup Language Interface".
Office action for U.S. Appl. No. 12/060,114, mailed on Sep. 6, 2013, Ryan et al., "Dynamically Populating Electronic Item", 67 pages.
Office Action for U.S. Appl. No. 13/902,717, mailed on May 21, 2015, Steven Kenneth Weiss, "Dynamic Display Dependent Markup Language Interface", 29 pages.

* cited by examiner

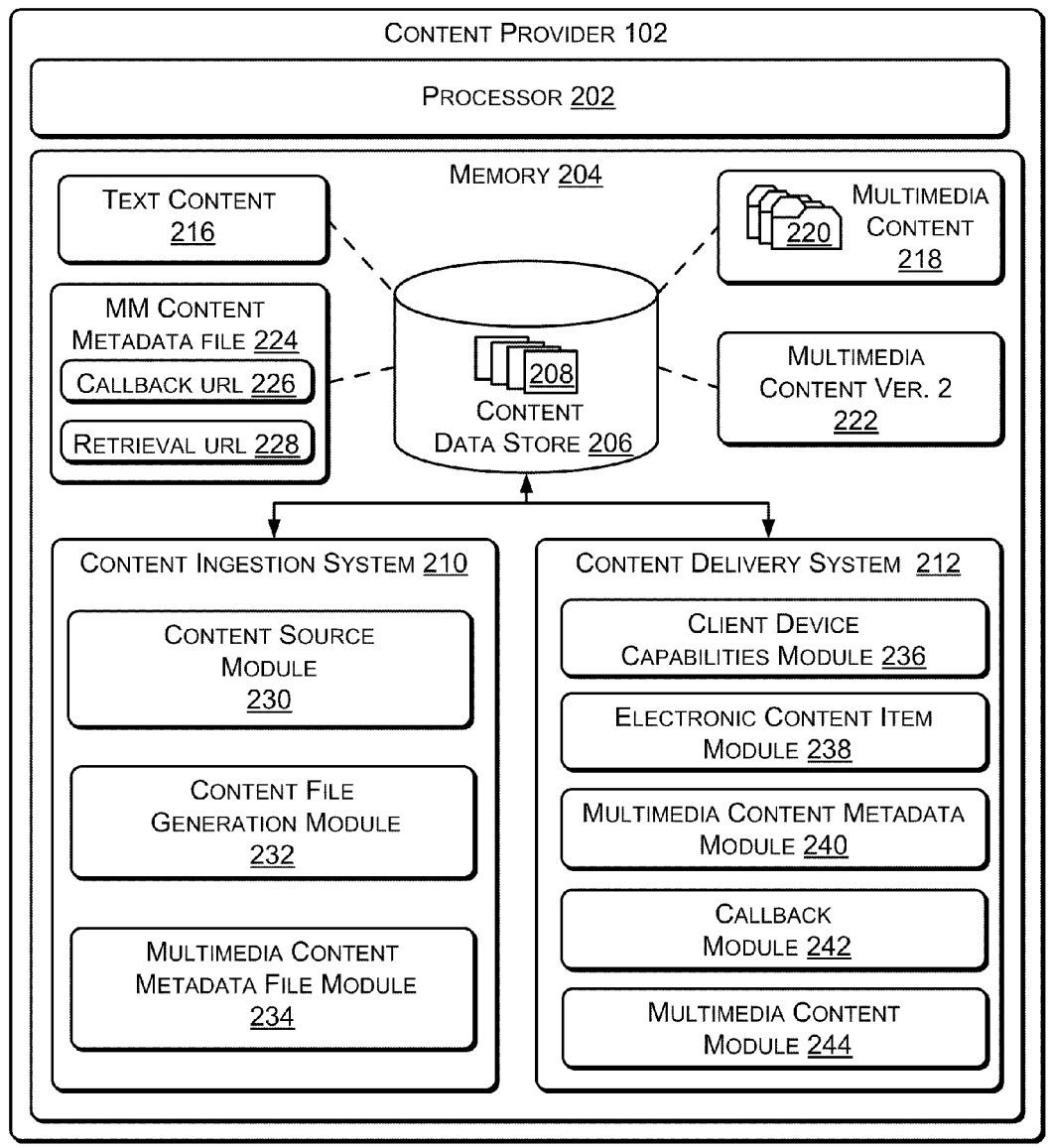
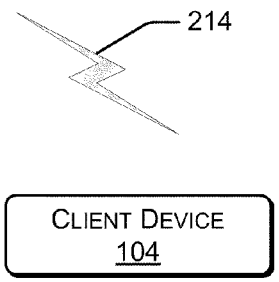
FIG. 2

*Traveling Europe*
Paris, France
Paris is the capital city of France. It is located on the Seine River, in northern France. The city of Paris has an estimated population of 2,203,817 with the metropolitan area having an estimated population of 11,769,433.
Paris is home to many world famous landmarks, such as the Eiffel Tower, 
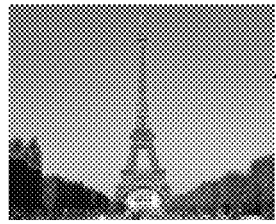 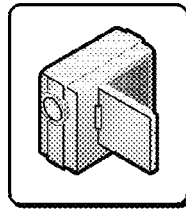
The Louvre 
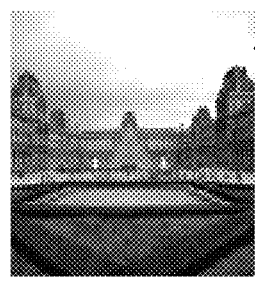 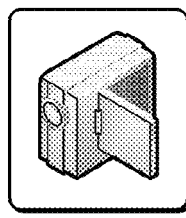
The Arc de Triumphe 
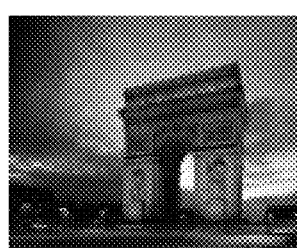 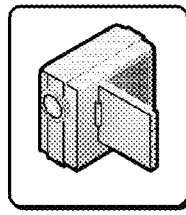
FIG. 5

PROVIDING TEXT CONTENT EMBEDDED WITH PROTECTED MULTIMEDIA CONTENT

PRIORITY CLAIM AND CROSS-REFERENCE TO RELATED APPLICATION

This application claims the benefit under 35 U.S.C. §119 (e)(1) of U.S. Provisional Application No. 61/333,207, filed May 10, 2010, which is hereby incorporated by reference.

BACKGROUND

Providing multimedia content via computing devices has become more prevalent as processing power and memory technologies have improved. In particular, as the capabilities of mobile phones and portable computing devices have increased, users have started to consume more and more multimedia content. For example, users of smart phones and tablet computers may readily download and consume multimedia content, such as video content, image content, and audio content. In some instances, the multimedia content may be embedded in an electronic content item with text content, such as in an email or in a webpage.

Additionally, as the capabilities of computing devices increase, content providers may desire to expand the use of multimedia content in different forms of electronic content. Further, as multimedia content is provided to increasing numbers of computing devices, maintaining the integrity of the multimedia content may become more difficult. Providing a satisfying user experience may also prove to be challenging as the performance of computing devices is affected by the consumption of memory space and processing power due to the retrieval and storage of increasing amounts of multimedia content.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 is a block diagram illustrating components of the content provider to provide multimedia content to client devices.

FIG. 5 shows a second illustrative example of a page of an electronic book, when rendered on a device, including text content embedded with multimedia content.

DETAILED DESCRIPTION

Figure 1:
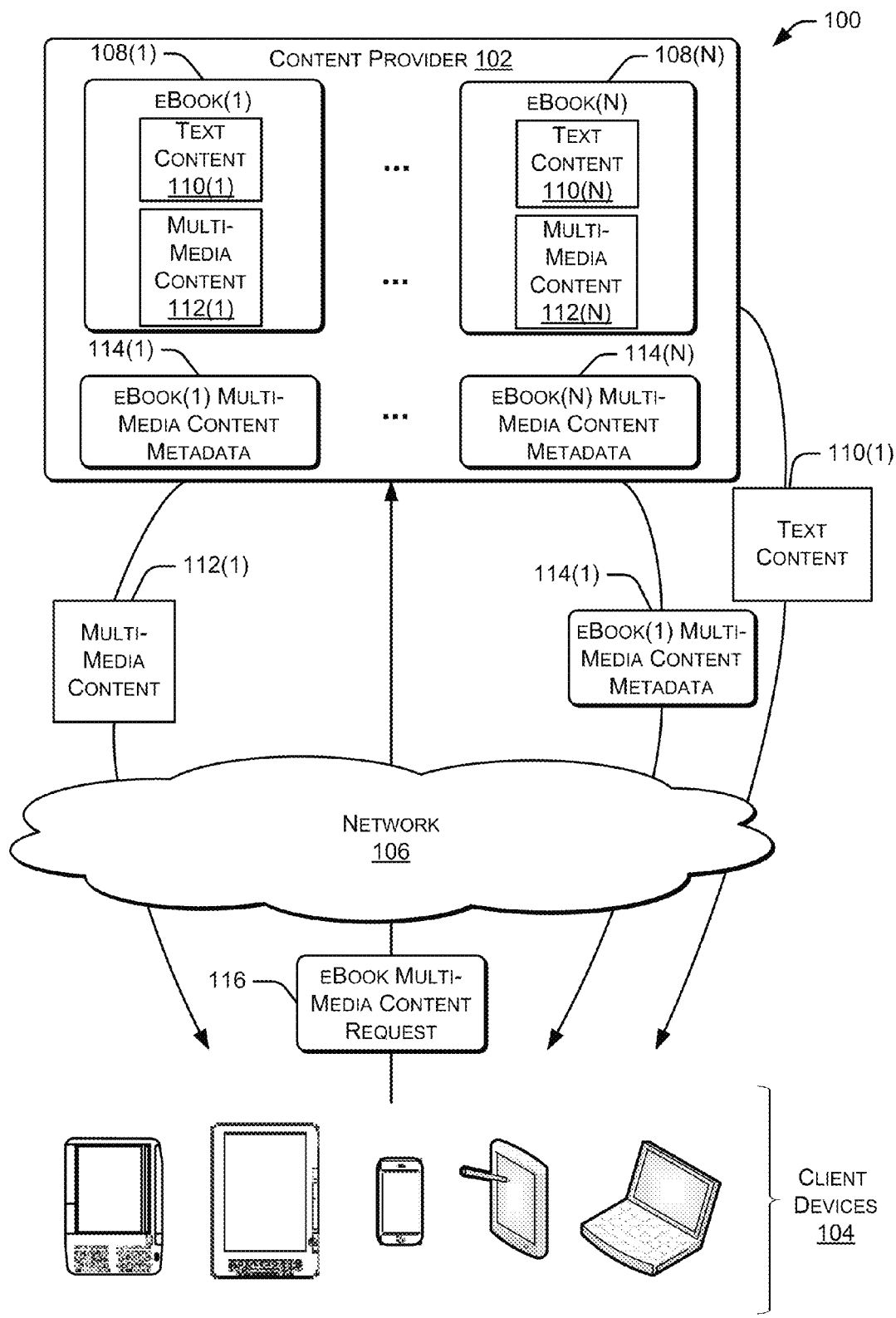
FIG. 1 is a block diagram illustrating a system including a content provider to distribute electronic books with embedded multimedia content to client devices.

This disclosure describes architectures and techniques for providing multimedia content to client devices, and in particular, providing multimedia content embedded in text content of electronic content items. In some instances, the text content of the electronic content item may be provided to the client device separate from the multimedia content. In these instances, content providers may send a specified file including multimedia content metadata indicating one or more storage locations of the multimedia content to a client device.

In an illustrative example, a client device may send a request to a content provider for an electronic content item, such as a web page or an electronic book, where the electronic content item includes one or more pages of text with multimedia content associated with at least some of the pages. In response to the request for the electronic content item, the content provider may send a text content file to the client device including the text of the electronic content item and a header indicating that multimedia content is embedded in the text content. The client device may then request the multimedia content metadata based on the header in the text content file and the client device may retrieve the multimedia content according to the multimedia content metadata. In some instances, the client device may retrieve only a portion of the multimedia content at any given time.

By sending the multimedia content metadata separately from the text content, the content provider may limit access to the multimedia content, thereby maintaining the integrity of the multimedia content. For example, the multimedia content metadata may include multimedia content location metadata, such as a multimedia content retrieval uniform resource locator (URL). Access to the multimedia content may be restricted because only a client device provided a signed version of the multimedia content retrieval URL may be able to retrieve the multimedia content. In addition, the multimedia content retrieval URL may be signed for only a certain period of time. Thus, once a client device receives authenticated multimedia content location metadata, the amount of time that the client device may access the multimedia content may be limited, such as for a duration of 1-5 minutes. In this way, the exposure of the multimedia content stored by the content provider is limited and the integrity of the multimedia content can more readily be maintained.

In addition, by providing multimedia content metadata separate from the text content file, all requests for multimedia content are directed through content provider servers. Thus, the content provider may gather information related to the retrieval of the multimedia content. For example, the content provider may track frequency of access of multimedia content, frequency of access of particular versions of the multimedia content, such as multimedia content playable via a particular audio codec or video codec, time of access of multimedia content, which users are accessing the multimedia content, an amount of time required by a particular client device to download the multimedia content, or a combination thereof. The metrics may be utilized by the content provider for debugging and maintenance to more efficiently and effectively provide multimedia content to the client devices.

Further, client devices may download a portion of multimedia content of a particular electronic content item in order to preserve memory space and processing power of the client device. In some cases, the client devices may prioritize the multimedia content to download. For example, the client device may only download multimedia content when it is selected by a user of the client device. Additionally, the client device may predict multimedia content that a user of a client device may want to consume and download the predicted multimedia content. The client device may utilize a user profile, historical data indicating multimedia content consumed via the client device, current text content being viewed via the client device, or a combination thereof, to determine the predicted multimedia content. As the downloaded multimedia content is consumed by the client device or as the downloaded multimedia content becomes less of a priority, the client device may purge the stale multimedia content. In this way, the memory space and processing power devoted to multimedia content may be minimized, enhancing the performance of the client device and allowing the resources of the client device to be utilized for a broader range of applications.

Some implementations of the architecture and techniques described herein are described in the context of providing multimedia content of electronic books. The terms "electronic book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, etc. However, certain concepts described herein are also applicable to other types of digital content items, such as music, audio books, video, and other content items that people watch, listens to, or otherwise experience.

Overview

FIG. 1 illustrates a system 100 to provide electronic books with multimedia content from a content provider 102 to client devices 104. The content provider 102 may include a number of data stores, such as a random array of independent disks (RAID). The content provider 102 may also include a single server, a cluster of servers, a server farm or data center, and so forth, although other server architectures (e.g., a mainframe architecture) may also be used. In the example illustrated in FIG. 1, the content provider 102 may be an online retailer that makes electronic content available for purchase. In other instances, the content provider 102 may provide a service to users, such as email storage and exchange or web page hosting.

The client devices 104 may be associated with a single user or with multiple users. Although five representative client devices 104 are shown in FIG. 1, the system 100 may include any number of client devices. The client devices 104 may include desktop computers, laptop computers, tablet computers, portable navigation systems, personal digital assistants (PDAs), portable media players, entertainment devices, netbooks, gaming consoles, electronic book reader devices, smart phones, mobile phones, DVD players, media centers, and the like.

The content provider 102 and the client devices 104 may communicate via a network 106. The network 106 may be representative of any one or combination of multiple different types of wired and wireless networks, such as the Internet, cable networks, satellite networks, wide area wireless communication networks, wireless local area networks, and public switched telephone networks (PSTN).

In the particular example shown in FIG. 1, the content provider 102 may store a number of electronic books, such as the electronic books 108(1)-108(N). The content provider 102 may receive the electronic books 108(1)-108(N) from a number of publishers. The electronic books 108(1)-108(N) may include text content 110(1)-110(N) and multimedia content 112(1)-112(N). In addition, the content provider 102 may distribute different versions of the electronic books 108(1)-108(N). For example, the content provider 102 may distribute multiple versions of the electronic book 108(1) having different resolutions, having content compatible with different audio and/or video codecs, or a combination thereof.

The multimedia content 112(1)-112(N) may be embedded in the text content 110(1)-110(N). Additionally, the multimedia content 112(1)-112(N) may include a number of files associated with video content, audio content, image content, or a combination thereof, of the respective electronic book 108(1)-108(N). In some cases, the multimedia content embedded in the text content may be provided via a client device 104 when a page of the electronic book including multimedia content is being viewed. For example, upon navigating to a particular page of an electronic book, images associated with the particular page may be displayed and video and/or audio content may be played. In other instances, the multimedia content may be provided via a client device upon selection by a user of the client device 104.

The content provider 102 may also include electronic book multimedia content metadata 114(1)-114(N). In some cases, the multimedia content metadata 114(1)-114(N) may be stored in one or more files separate from the corresponding electronic book 108(1)-108(N). The electronic book multimedia content metadata 114(1)-114(N) may include an identifier indicating the electronic book 108(1)-108(N) associated with the multimedia content metadata 114(1)-114(N), a file size of each file of the respective multimedia content 112(1)-112(N), or a combination thereof. The electronic book multimedia content metadata 114(1)-114(N) may also include electronic book multimedia content location metadata indicating a storage location of the respective multimedia content 112(1)-112(N). For example, the electronic book multimedia content location metadata may indicate memory addresses where the files of the multimedia content 112(1)-112(N) are stored. Thus, the electronic book multimedia content metadata 114(1)-114(N) may be utilized by the client devices 104 to obtain the multimedia content 112(1)-112(N).

In an illustrative example, a client device 104 requests an electronic book 108(1) from the content provider 102. The request may be related to the purchase of the electronic book 108(1) from the content provider 102. In response to receiving the request for the electronic book 108(1), the content provider 102 may send the text content 110(1), to the requesting client device 104. The text content 110(1) may be part of a text content file that also includes an indication that the electronic book 108(1) is associated with multimedia content, such as the multimedia content 112(1).

Continuing with this example, the content provider 102 may send electronic book multimedia content metadata 114(1) to the client device 104 requesting the electronic book 108(1). The electronic book multimedia content metadata 114(1) may be sent concurrently with the text content 110(1). Alternatively, the electronic book multimedia content metadata 114(1) may be sent in response to a specific request from the requesting client device 104. For example, a client device 104 may receive an indication that the text content 110(1) is embedded with multimedia content 112(1) and subsequently send a request to the content provider 102 for the electronic book multimedia content metadata 114(1).

The electronic book multimedia content metadata 114(1) may specify files of the multimedia content 112(1) that correspond to the capabilities of the requesting client device 104. For example, the electronic book multimedia content metadata 114(1) may specify files of the multimedia content 112(1) that are playable at a certain resolution, with a particular audio codec, with a particular video codec, or a combination thereof.

The client device 104 that has requested the electronic cook 108(1) may utilize the electronic book multimedia content metadata 114(1) to retrieve the multimedia content 112(1). For example, the requesting client device 104 may identify multimedia content location metadata of the electronic book multimedia content metadata 114(1), such as a multimedia content retrieval URL, and send an electronic book multimedia content request 116 including the multimedia content retrieval URL to the content provider 102 to obtain the multimedia content 112(1). In some instances, the content provider 102 may prevent the client device 104 from obtaining the multimedia content 112(1) until the client device 104 has submitted an authenticated version of the multimedia content retrieval URL.

The requesting client device 104 may retrieve all of the multimedia content 112(1) or a portion of the multimedia content 112(1). For example, the requesting client device 104 may retrieve files of the multimedia content 112(1) that have been selected by a client device user, files of the multimedia content 112(1) associated with a page of the electronic book 108(1) that is currently being viewed via the requesting client device 104, and/or the requesting client device 104 may retrieve predicted files of the multimedia content 112(1) that may be consumed via the requesting client device 104. By providing the ability to retrieve only a portion of the multimedia content 112(1), the memory space and processing power of the requesting client device 104 devoted to retrieving and storing multimedia content of electronic books is minimized.

After receiving the electronic book multimedia content request 116, the content provider 102 may extract the storage location of requested files of the multimedia content 112(1), retrieve the requested files of the multimedia content 112(1), and send these files to the requesting client device 104. The client device 104 receiving the files of the multimedia content 112(1) may then cache the files or present the files to a user of the client device 104 via one or more output devices of the client device 104.

Content Provider Architecture

FIG. 2 illustrates components of the content provider 102 that provides multimedia content to the client device 104. The content provider 102 includes one or more processors indicated by the processor 202. The content provider 102 also includes memory 204 that is accessible to the processor 202. The memory 204 is an example of computer readable storage media and may include volatile memory, nonvolatile memory, removable memory, non-removable memory, or a combination thereof. For example, the memory 204 may include, but is not limited to, RAM, ROM, EEPROM, flash memory, one or more hard disks, optical memory, or other memory technologies. The memory 204 may store electronic content to provide to client devices and a number of modules including computer-readable instructions executable by the processor 202 to provide text content embedded with multimedia content.

The memory 204 includes a content data store 206 that may include a number of mass storage devices to store electronic content items, such as the electronic content item 208. The electronic content items may include emails, web pages, electronic books, instant messages, advertisements, text messages, picture messages, video messages, or a combination thereof. In some cases, the electronic content items may include text content embedded with multimedia content. For example, the content data store 206 may include electronic books that are embedded with at least one of video content, audio content, and image content.

The memory 204 also includes a content ingestion system 210 and a content delivery system 212. The content ingestion system 210 may receive electronic content items from one or more sources and prepare the electronic content items for distribution to one or more client devices, such as the client device 104. The content delivery system 212 provides electronic content items 204 to the client devices via a communication link 214.

Each electronic content item may be associated with text content and multimedia content. For example, the electronic content item 208 is associated with text content 216 and multimedia content 218. The multimedia content 218 may include one or more multimedia content files 220, such as one or more video content files, one or more audio content files, one or more image content files, or a combination thereof. The electronic content item 208 may also be associated with multiple versions of the multimedia content 218, such as a second version of the multimedia content 222. The multimedia content 218 and the second version of the multimedia content 222 may include files having similar content, but rendered according to different resolutions, playable via different video codecs, playable via different audio codecs, and so on.

Further, the electronic content item 208 in the content data store 206 may be associated with a respective multimedia content metadata file 224. The multimedia content metadata file 224 may include identifiers linking respective multimedia content files 220 to the electronic content item 208. In addition, the multimedia content metadata file 224 may include file sizes of the respective multimedia content files 220. Further, the multimedia content metadata file 224 may include verification data, such as a checksum, to verify that the multimedia content 218 provided to the client device 104 has not been altered or tampered with during transmission of the multimedia content 218 to the client device 104. In this way, the multimedia content 218 may be sent to the client device 104 without utilizing a secure connection, such as via a HTTPS connection.

The multimedia content metadata file 224 may also include a callback URL 226 and multimedia content location metadata, such as a multimedia content retrieval URL 228. The multimedia content retrieval URL 228 may indicate a storage location of one or more of the multimedia content files 220 associated with the electronic content item 208. The callback URL 226 may be utilized by the client device 104 to obtain an authenticated version of the multimedia content retrieval URL 228.

The content ingestion system 210 includes a content source module 230 to receive and/or obtain electronic content items from one or more sources. For example, the content source module 230 may retrieve electronic books from a number of different publishers. In some cases, the publishers may send electronic book files to the content provider 102 that include text content and multimedia content. In another example, the content source module 230 may receive web pages from web servers of different entities providing electronic content via the Internet.

The content ingestion system 210 also includes a content file generation module 232 to prepare the electronic content items to be distributed by the content provide 202 to client device 104. In particular, the content file generation module 232 may separate the text content and multimedia content of electronic content items received from a source. In this way, the text content and the multimedia content of a particular electronic content item may be provided to the client device 104 separately.

In an illustrative example, the content file generation module 232 may generate a layout of a page of the electronic content item 208, such as a page of an electronic book. The page may include one or more text portions and one or more multimedia portions. The text portions may be populated with text from the text content 216, while the multimedia portions include references to multimedia content files 220 that are embedded in the text. In some instances, the references may indicate a storage location for retrieving the multimedia content files 220, while in other instances the references may serve as placeholders for the multimedia content files 220 without providing information needed to access the multimedia content files 220.

In a particular implementation, the content file generation module 232 may alter HTML code of the electronic content item 208 by removing information in the HTML code associated with at least a portion of the multimedia content files 220, such as one or more applets or one or more links to the multimedia content files 220, and replacing the information with HTML tags that include unique identifiers that serve as a reference to obtain metadata about the multimedia content files 220. The content file generation module 232 may also place a multimedia content reference header in the text content 216 to indicate that the electronic content item 208 is associated with the multimedia content 218.

Additionally, the content file generation module 232 may transcode multimedia files received from a source into a number of different files that may be consumed via client devices with differing capabilities. In one illustrative implementation, the content file generation module 232 may produce a number of versions of the electronic content item 208 having the same text, but different multimedia items. For example, some of the files associated with the electronic content item 208 may include video content that is playable via client devices implementing an MPEG-4 codec, such as H.264, while other files may include video content that is playable via client devices implementing a Windows Media Video codec. In another example, the content file generation module 232 may produce files for the electronic content item 208 with differing resolutions for video content and image content and/or files with audio content playable by client devices implementing different audio codecs. Thus, the content file generation module 232 may generate a number of different files for the particular electronic content item 208 that include the same text content, but are embedded with multimedia content having different properties that can be played back by client devices with different capabilities.

In addition, the content file generation module 232 may generate files for the electronic content item 208 based on different subscriptions offered by the content provider 102. For example, the content file generation module 232 may generate multimedia content files with higher quality graphics and audio for client devices associated with a premium subscription and multimedia content files with lower quality graphics and audio for client devices associated with a basic subscription.

The content ingestion system 210 also includes a multimedia content metadata file module 234 to generate multimedia content metadata files for electronic content items that include metadata associated with multimedia content of the electronic content items. In some cases, the multimedia content metadata file module 234 may generate multiple multimedia content metadata files for each electronic content item, with each multimedia content metadata file corresponding to a particular version of the multimedia content for the respective electronic content item.

In an illustrative implementation, the multimedia content metadata file module 234 may generate the multimedia content metadata file 224 for the electronic content item 208. The multimedia content metadata file 224 may be an XML file including a unique identifier for the multimedia content files 220, as well as unique identifiers for multimedia content files of the second version of the multimedia content 222. The multimedia content metadata file 224 may also include a file size for each multimedia content file 220. Additionally, the multimedia content metadata file 224 may include the callback URL 226 and the multimedia content retrieval URL 228. The callback URL 226 may be used to retrieve an authenticated version of the multimedia content retrieval URL 228. In addition, the callback URL 226 may remain unchanged until modified by an administrator of the content provider 102. In this way, a client device receiving the callback URL 226 can continue to send requests for authenticated versions of the multimedia content retrieval URL 228 to the same callback URL 226 after the authenticated versions of the multimedia content retrieval URL 228 expire.

The multimedia content retrieval URL 228 may indicate a storage location of the multimedia content files 220. In some implementations, the multimedia content metadata file 224 may include a plurality of multimedia content retrieval URLs 228 that indicate a storage location of each of the multimedia content files 220. The multimedia content retrieval URL 228 may expire after a specified period of time. Additionally, the multimedia content retrieval URL 228 may change when the storage location of one or more of the multimedia content files 220 changes, such as when the multimedia content files 220 are updated. Thus, the multimedia content metadata file module 234 may generate a new multimedia content retrieval URL after the multimedia content retrieval URL 228 has expired.

The content delivery system 212 includes a client device capabilities module 236. The client device capabilities module 236 may determine capabilities of client devices that are receiving electronic content items from the content provider 102. For example, the client device capabilities module 236 may determine a resolution of video content and/or image content supported by the client device 104, an audio codec implemented by the client device 104, a video codec implemented by the client device 104, or a combination thereof. The capabilities of the client device 104 may also relate to hardware of the client device 104 and/or software executed by the client device 104, such as an operating system.

In some scenarios, the client device capabilities module 236 may determine the capabilities of the client device 104 based on information received from the client device. In other cases, the client device capabilities module 236 may determine that the client device 104 is of a particular type of smart phone or media player and access specifications obtained from a manufacturer of the client device 104 or another source indicating the capabilities of the client device 104.

In some instances, the client device 104 may support a number of resolutions and implement a number of video and/or audio codecs. In these cases, the client device capabilities module 236 may determine a preferred configuration of the client device 104. The preferred configuration of the client device 104 may be specified by a user of the client device 104. The client device 104 may periodically provide capabilities information to the content provider 102. In addition, the client device capabilities module 236 may poll the client device 104 for capabilities information at predetermined intervals and/or in response to a request for an electronic content item from the client device 104.

The content delivery system 212 also includes an electronic content item module 238 that is configured to receive a request from the client device 104 for the electronic content item 208. In response to receiving the request, the electronic content item module 238 may retrieve the text content 216 and send the text content 216 to the client device 104. Alternatively, the electronic content item module 238 may push the text content 216 of the electronic content item 208 to the client device 104 without receiving a request for the electronic content item 208. In some cases, when the electronic content item 208 is part of a work that is published according to a schedule, such as a newspaper or magazine, the electronic content module 238 may send the text content 216 to the client device 104 in accordance with the schedule. In addition, the electronic content module 238 may send updates associated with the text content 216 to the client device 104 without first receiving a request for the updates.

The content delivery system 212 includes a multimedia content metadata module 240 to provide multimedia content metadata to client devices. In some cases, the multimedia content metadata files provided to the client devices depends on the capabilities of the respective client devices. In an illustrative implementation, the multimedia content metadata module 240 may receive a request for the multimedia content metadata associated with the electronic content item 208 from the client device 104 after the client device 104 has requested the electronic content item 208. The request for the multimedia content metadata file may include an identifier of the electronic data item 208. The request for the multimedia content metadata file may also include identifiers of at least a portion of the particular multimedia content files associated with the electronic content item 208.

In response to receiving the request for the multimedia content metadata file, the multimedia content metadata module 240 identifies a multimedia content metadata file that is associated with multimedia content that is consistent with the capabilities of the client device 104. For example, based on the capabilities of the client device 104, the multimedia content metadata module 240 may determine that the client device 104 can consume the multimedia content 218. Accordingly, the multimedia content metadata module 240 may send at least a portion of the multimedia content metadata file 224 to the client device 104. In particular, the multimedia content metadata module 240 may send the callback URL 226 and one or more multimedia content location retrieval URLs 228 to the client device 104. When the client device 104 has requested only a portion of the multimedia content files 220, the multimedia content metadata module 240 may send the multimedia content retrieval URLs 228 corresponding to the requested multimedia content files 220 to the client device 104. The multimedia content retrieval URL(s) 228 sent to the client device 104 may be included in a query string of the callback URL 226.

The content delivery system 212 also includes a callback module 242 to receive callback requests from client devices for authenticated versions of multimedia content retrieval URLs. The callback requests may be directed to a callback URL provided to the client devices from the content provider. In addition, the callback requests may include at least one multimedia content retrieval URL.

In an illustrative example, the callback module 242 may receive a callback request from the client device 104 directed to the callback URL 226. The callback request may include the multimedia content retrieval URL 228 in a query string of the callback URL 226. The callback module 242 may extract the multimedia content retrieval URL 228 from the callback request and sign the multimedia content retrieval URL 228. The callback module 224 then sends the signed multimedia content retrieval URL 228 to the client device 104. The signed multimedia content retrieval URL 228 may expire after a certain period of time, such as between 1-5 minutes. Thus, by limiting access to the multimedia content 218 for a relatively short period of time, the content provider 102 can more readily maintain the integrity of the multimedia content 218.

The content delivery system 212 includes a multimedia content module 244 that provides multimedia content to client devices. In an illustrative implementation, the multimedia content module 244 receives a request for at least a portion of the multimedia content 218 from the client device 104. The request for the multimedia content 218 may include a signed version of the multimedia content retrieval URL 228. The multimedia content module 244 may retrieve the multimedia content files 220 associated with the signed multimedia content retrieval URL 228 and send the retrieved multimedia content files 220 to the client device 104. In some cases, the request for the multimedia content 218 may include a number of signed multimedia content retrieval URLs 228. In these cases, the multimedia content module 244 retrieves the multimedia content files 220 associated with each signed multimedia content retrieval URL 228 and sends the corresponding multimedia content files 220 to the client device 104.

The content delivery system 212 may also determine multimedia content to send to the client device 104 without receiving a specific request for the multimedia content. For example, the content delivery system 212 may predict multimedia content to be consumed via the client device 104 or identify a current page being rendered via the client device 104 and provide the corresponding multimedia content to the client device 104.

Client Device Architecture

Figure 3:
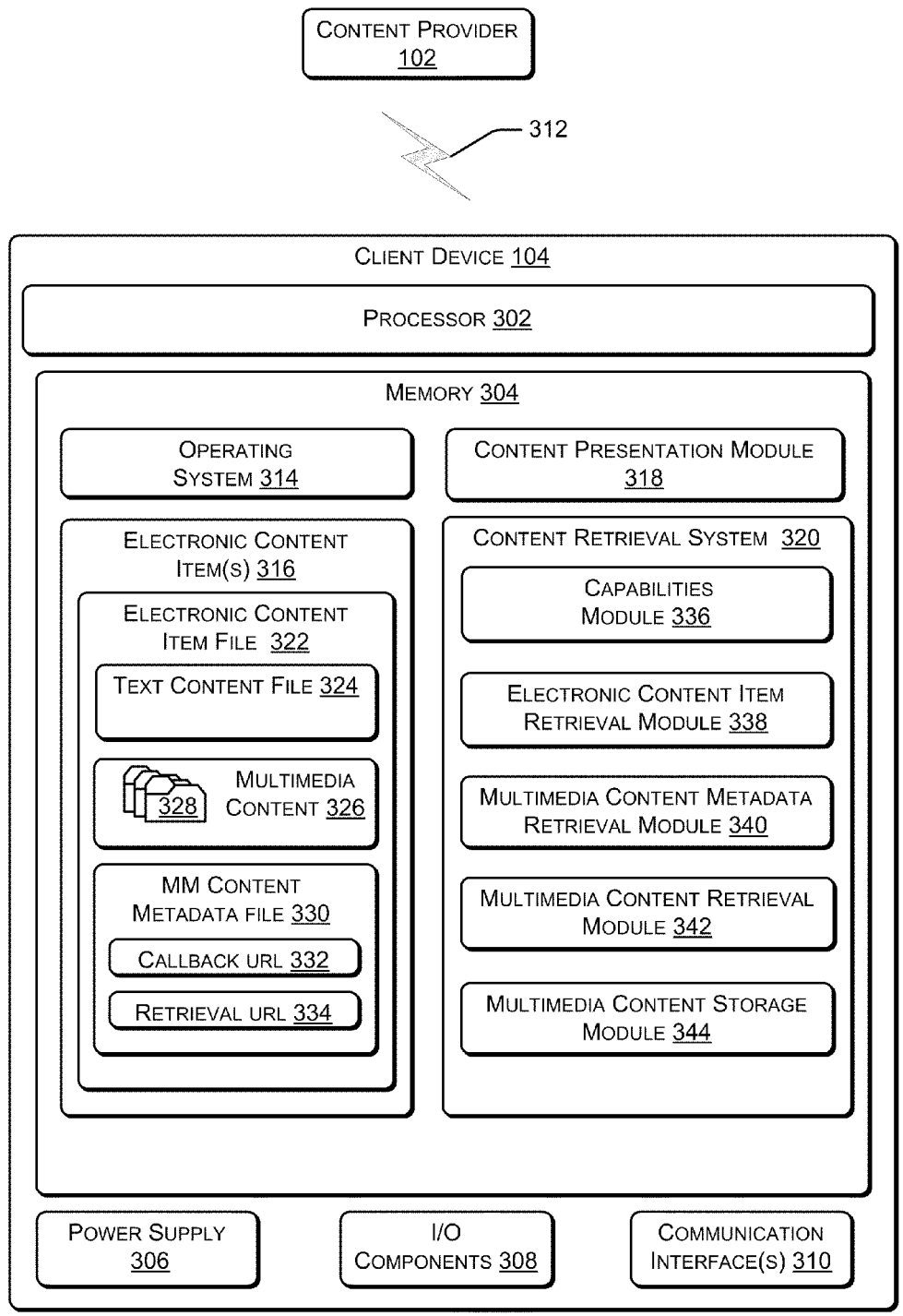
FIG. 3 is a block diagram illustrating components of the client device to obtain multimedia content from a content provider.

FIG. 3 illustrates components of a client device 104 to obtain multimedia content from a content provider 102. The client device 104 includes one or more processors indicated by processor 302. In addition, the client device 104 includes memory 304. The memory 304 is an example of computer readable storage media and may include volatile memory, nonvolatile memory, removable memory, non-removable memory, or a combination thereof. Thus, the memory 304 may include, but is not limited to, RAM, ROM, EEPROM, flash memory, one or more hard disks, optical memory, or other memory technologies. The memory 304 includes a number of modules including computer-readable instructions executable by the processor 302 to obtain and present text content embedded with multimedia content.

The client device 104 also includes a power supply (e.g. battery) and power control unit 306 and input/output components 308. The input/output components 308 may include a touch screen, a keyboard, speakers, a microphone, a display device, or a combination thereof. The client device 104 also includes communication interfaces 310 to facilitate wired and/or wireless communications via a communication link 312 with the content provider 102, one or more additional client devices, one or more remote devices, one or more local devices, or a combination thereof.

The memory 304 includes an operating system 314 to control and coordinate usage of resources of the computing device 104. In addition, the memory 304 stores electronic content items 316, such as electronic books, web pages, emails, instant messaging sessions, text messages, video messages, picture messages, or a combination thereof. At least a portion of the electronic content items 316 may include text content embedded with multimedia content. In some cases, the electronic content items 316 may be obtained via the content provider 102. The memory 304 also includes a content presentation module 318 to provide the electronic content items 316 to a user of the client device 104 via the input/output components 308. In some cases, particular multimedia content items, such as a video presentation, may be provided via one or more user interfaces rendered by the content presentation module 318. Additionally, the memory 304 includes a content retrieval system 320 to obtain the electronic content items 316 from the content provider 102.

Each electronic content item 316 includes a corresponding electronic content item file, such as the electronic content item file 322. The electronic content item file 322 includes a text content file 324 and multimedia content 326. The multimedia content 326 may include a number of multimedia content files 328, such as one or more image content files, one or more video content files, one or more audio content files, or a combination thereof. In a particular example, the text content 324 may include at least a text portion of an electronic book, while the multimedia content 326 includes image content, video content, audio content, or a combination thereof, embedded in the text portion.

The electronic content item file 322 may also include a multimedia content metadata file 330. The multimedia content metadata file 330 may include information associated with the multimedia content 326, such as a callback URL 332 and one or more multimedia content retrieval URLs 334. The callback URL 332 may be sent to the content provider 102 to obtain an authenticated version of the multimedia content retrieval URL 334. The multimedia content retrieval URL 334 may indicate a storage location of one or more multimedia content files associated with the multimedia content 326, such as the multimedia content files 328. The authenticated version of the multimedia content retrieval URL 334 may be sent to the content provider 102 to retrieve multimedia content files associated with the multimedia content 326.

The content retrieval system 320 includes a capabilities module 336 to determine the capabilities of the client device 104. The capabilities of the client device 104 may correspond to a resolution of video content and/or image content that the client device 104 may render. In addition, the capabilities of the client device 104 may include video codecs implemented by the client device 104, such as MPEG-4 codecs or Windows Media Video codecs, and audio codecs implemented by the client device 104, such as MP3, Windows Media Audio, or Advanced Audio Coding (AAC). Further, the capabilities of the client device 104 may include hardware resources of the client device 104, such as the communication interfaces 310 or a type of the processor 302, and software resources of the client device 104, such as security software implemented by the client device 104 and a type of the operating system 314. The capabilities of the client device 104 may also include a computational load of the processor 302 and available storage space of the memory 304. The capabilities module 336 may also determine whether a user of the client device 104 has specified a preferred configuration of the client device 104, such as a preferred resolution, a preferred video codec, and/or a preferred audio codec.

The capabilities module 336 may send information to the content provider 102 indicating the capabilities of the client device 104. The capabilities module 336 may send the capabilities information to the content provider 102 on a periodic basis or when the capabilities of the client device 104 change. In some cases, the capabilities module 336 may send capabilities information to the content provider 102 in response to a request from the content provider 102 for the capabilities information.

The content retrieval system 318 also includes an electronic content item retrieval module 338 to obtain electronic content items from the content provider 102. For example, the electronic content item retrieval module 338 may send a request to the content provider 102 to purchase an electronic book. In some cases, the electronic book may relate to a magazine or newspaper that is published regularly. In these situations, the electronic content retrieval module 338 may send periodic requests to the content provider 102 for the regularly published electronic content items based on when the electronic content items are available for download. The electronic content retrieval module 338 may also receive indications from the content provider 102 that electronic content items or updates to electronic content items are ready to be downloaded. Consequently, the electronic content item retrieval module 338 may send a request for the corresponding the updates of the electronic content items to the content provider 102. In addition, the electronic content item retrieval module 338 may generate the electronic item content file 322 to store the data associated with the requested electronic content item, such as the text content file 324, the multimedia content 326, and the multimedia content metadata file 330.

In an illustrative implementation, the electronic content item retrieval module 338 may request an electronic content item including text content embedded with multimedia content. In response to the request, the client device 104 may receive the text content file 324 from the content provider 102. The text content file 324 includes the text portions of the requested electronic content item, as well as, identifiers of the multimedia content embedded in the text portions, such as an alphanumeric code. The identifiers serve as placeholders indicating multimedia content that corresponds to certain portions of the text content, but the identifiers may not provide information necessary to directly obtain the multimedia content from the content provider 102. The text content file 324 may also include a multimedia content reference header indicating that multimedia content is embedded in the text portions.

The content retrieval system 320 includes a multimedia content metadata retrieval module 340. The multimedia content metadata retrieval module 340 may be executed in response to identifying a multimedia content reference header in the text content file 324. For example, when the text content file 324 includes a multimedia content reference header, the multimedia content metadata retrieval module 340 may send a request to the content provider 102 for multimedia content metadata. The multimedia content metadata may include information that can be utilized to retrieve multimedia content associated with a requested electronic content item. In particular, the multimedia content metadata retrieval module 340 may extract an identifier of the requested electronic content item from the text content file 324 and include the identifier in the request for multimedia content metadata.

The client device 104 may receive the multimedia content metadata file 330 from the content provider 102 in response to the request for multimedia content metadata. The multimedia content metadata file 330 may include the callback URL 332 and one or more multimedia content retrieval URLs 334. The callback URL 332 and the multimedia content retrieval URLs 334 may be used to retrieve multimedia content files associated with text content file 324. In some cases, the callback URL 332 and/or the multimedia content retrieval URLs 334 may indicate that different multimedia content files are to be retrieved from different sources. The multimedia content metadata file 330 may also include a file size and file identifier associated with each of the multimedia content files 328.

Further, the content retrieval system 320 includes a multimedia content retrieval module 342 to retrieve multimedia content from the content provider 102 according to the multimedia content metadata of the multimedia content metadata file 330. For example, the multimedia content retrieval module 342 may obtain the multimedia content 326 by utilizing the callback URL 332 and the multimedia content retrieval URLs 334. For example, the multimedia content retrieval module 342 may send the callback URL 332 to the content provider 102 with a query string including the multimedia content retrieval URLs 334. In response, the client device 104 may receive a signed version of the multimedia content URLs 334 and the multimedia content retrieval module 342 may then send the signed versions of the multimedia content retrieval URLs 324 to the content provider 102 to obtain the multimedia content 326.

As the multimedia content 326 is being received by the client device 104, the multimedia content retrieval module 342 may provide a progress bar indicating the progress of downloading the multimedia content 326. For example, the multimedia content retrieval module 342 may compare the amount of multimedia content 326 downloaded with the total size of the multimedia content files 328 to generate the progress bar.

In some implementations, the multimedia content retrieval module 342 may retrieve all of the multimedia content files 328, while in other implementations, the multimedia content retrieval module 342 may obtain a portion of the multimedia content files 328. In some cases, the number of the multimedia content files 328 retrieved may depend on memory capacity of the client device 102, availability of the multimedia content files 328 at the content provider 328, user preference, or a combination thereof.

In an illustrative implementation, the multimedia content retrieval module 342 may obtain portions of the multimedia content 326 as certain multimedia content files are selected by a user of the client device 102. For example, the multimedia content retrieval module 342 may receive an indication that a user has selected a particular multimedia content file to consume, such as via touch screen, pointing device, keyboard, or voice input. In response to selection of the particular multimedia content file, the multimedia content retrieval module 342 can send a request for the multimedia content file to the content provider 102. In a particular example, the multimedia content retrieval module 342 may send a request for the multimedia content file to the content provider 102 including a callback URL 332 and a query string including a multimedia retrieval URL 334 associated with the requested multimedia content file. After receiving a signed version of the multimedia content retrieval URL 334 from the content provider 102, the multimedia content retrieval module 342 may send the signed version of the multimedia content retrieval URL 334 to the content provider 102 to retrieve the requested multimedia content file.

Additionally, the multimedia content retrieval module 342 may retrieve multimedia content from the content provider 102 based on predictions relating to multimedia content that may be consumed by a user of the client device 102. For example, the multimedia content retrieval module 342 may predict multimedia content that will be consumed by a user of the client device 102 based on past selection history of the user, a current location within an electronic content item, a user profile or a combination thereof. In a particular illustration, as a user of the client device 102 reads through an electronic content item, such as an electronic book, the multimedia content retrieval module 342 may determine a current page or article that the user of the client device 102 is reading. The multimedia content retrieval module 342 may then obtain multimedia content associated with the current page or article. The multimedia content retrieval module 342 may also predict a future page or article of the electronic book that may be consumed by the user and obtain the multimedia content associated with the future page or article. In some cases, the future page of the electronic book may be the next page. Additionally, in another illustrative example, when a user of the client device 102 is reading a cook book, the multimedia content retrieval module 342 may determine favorite recipes of the user and obtain multimedia content associated with the user's favorite recipes. In still other examples, the multimedia content retrieval module 342 may obtain multimedia content associated with favorite workout routines when the user is reading a fitness book or magazine or obtain multimedia content associated with favorite travel destinations when the user is reading a travel book or magazine.

In some scenarios, the client device 102 may receive only a portion of the multimedia content associated with an electronic content item when a download of the multimedia content is interrupted. The download of the multimedia content may be interrupted based on user input, network difficulties, or device failure. The multimedia content retrieval module 342 may track the progress of downloading the multimedia content and resume downloading the multimedia content when possible. In some implementations, the multimedia content retrieval module 342 may utilize an HTTP range request to retrieve the remainder of the multimedia content.

The multimedia content retrieval module 342 may also receive information from the content provider 102 regarding updates to multimedia content associated with electronic content items 316 stored at the client device 102. In these cases, the multimedia content retrieval module 342 may obtain multimedia content based on updated multimedia content metadata received from the content provider 102, such as an updated callback URL and/or an updated multimedia content retrieval URL. In some cases, the multimedia content retrieval module 342 may utilize a previously received callback URL, such as the callback URL 332, to retrieve an updated multimedia content retrieval URL from the content provider 102 that can be used to retrieve the updated multimedia content.

The content retrieval system 320 also includes a multimedia content storage module 344 to store multimedia content obtained from the content provider 102. The multimedia content storage module 344 may determine whether to provide multimedia content received from the content provider 102 to an output device or to store the multimedia content for subsequent consumption via the client device 102. For example, when a user of the client device 102 is reading a page of an electronic book and selects to consume multimedia content on the page, then the multimedia content storage module 344 may determine that the multimedia content obtained from the content provider 102 is to be provided to the user of the client device 102 via one or more output devices.

In another example, when predicted multimedia content is retrieved from the content provider 102, the predicted multimedia content may be cached or stored more permanently in the memory 304. In an illustrative implementation, the multimedia content storage module 344 may cache multimedia content for a range of pages of an electronic book being read by a user of the client device 102 based on a current location of the user in the electronic book. As the user reads through the electronic book, the multimedia content storage module 344 may discard multimedia content that is outside of the range of pages, while storing new multimedia content as the user progresses through the electronic book. In addition, as the user reads through the electronic book, multimedia content of previously read pages can be purged from the cache and replaced with new content from subsequent pages. The multimedia content storage module 344 may also store multimedia content for a specified period of time, such as for a duration expressed in a licensing agreement associated with the multimedia content or until a user of the client device 102 decides to delete the electronic content.

Once multimedia content has been retrieved from the content provider 102 and is to be presented to a user of the client device 104, the content presentation module 318 may provide the multimedia content to the user via one or more output devices, such as a display and speakers. In some situations, the content presentation module 318 may determine that the client device 102 is incapable of rendering the multimedia content for a particular electronic content item. For example, the client device 102 may not have certain video or audio capabilities. Accordingly, the content presentation module 318 may send the multimedia content to another device for rendering. For example, when the client device 102 is an eBook reader device that does not have the capability to render video, the content presentation module 318 may send a video portion of the multimedia content to a television or a desktop computer in communication with the client device 102 for rendering. In some implementations, a user of the client device 102 may specify that multimedia content is to be rendered on another device.

Illustrative Examples of Text Embedded with Multimedia Content

Figure 4:
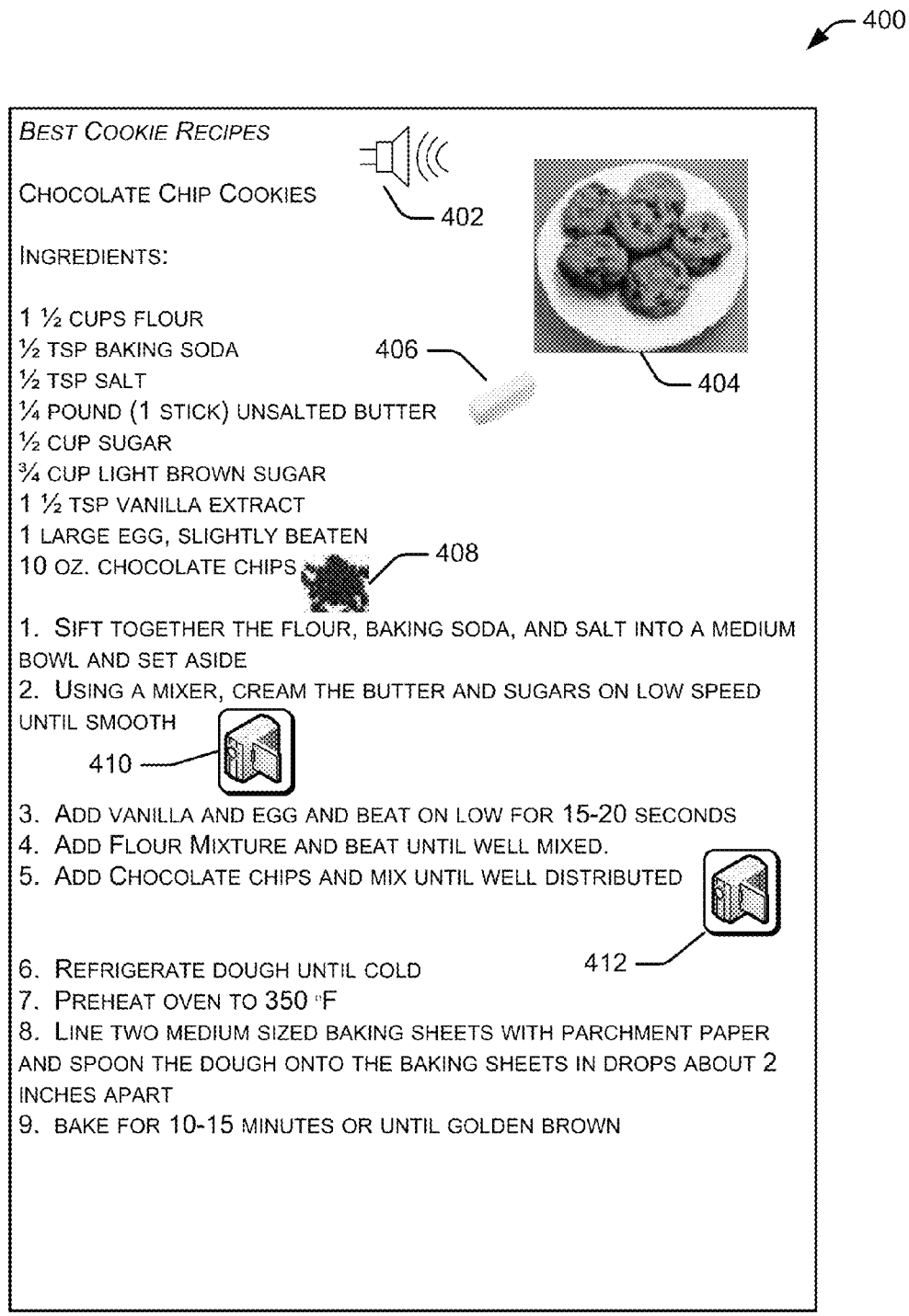
FIG. 4 shows a first illustrative example of a page of an electronic book, when rendered on a device, including text content embedded with multimedia content.

FIG. 4 shows a first illustrative example of a page 400 of an electronic book including text content embedded with multimedia content. In particular, the page 400 is included in a fictitious cook book entitled, "Best Cookie Recipes" and includes a recipe for chocolate chip cookies. The page 400 may be displayed via a particular client device 104, such as a smart phone, table computer, or eBook reader device. In the illustrative implementation shown in FIG. 4, the client device 104 is an eBook reader device.

The page 400 includes text detailing the ingredients and steps of the recipe. In addition, the page 400 is embedded with multimedia content items. For example, the page 400 includes an audio content link 402. By selecting the link 402, audio associated with the page 400 may be provided via speakers of the client device 104. In an illustrative example, selection of the audio content link 402 may provide audio instructions to prepare chocolate chip cookies according to the recipe of the page 400.

The page 400 also includes image multimedia content items 404-408. For example, the page 400 includes a first image content item 404 showing a picture of chocolate chip cookies. Additionally, the page 400 includes second and third image content items 406 and 408 showing pictures of ingredients of the recipe, butter and chocolate chips. In some cases, the images of the ingredients may be provided by a sponsor of the electronic book and serve as a form of advertising for companies that make and/or distribute the ingredients.

The page 400 also includes video content links 410 and 412. By selecting the links 410 and 412, video content may be provided via the client device 104. In some instances, the video content may be provided in a separate window on the display of the client device 104. In an illustrative example, selection of the links 410 and 412 may provide video content showing one or more steps associated with the recipe shown on the page 400.

FIG. 5 shows a second illustrative example of a page 500 of an electronic book including text content embedded with multimedia content. In particular, the page 500 is included in a fictitious travel book entitled, "Traveling Europe" and includes information about Paris, France. The page 500 may be displayed via a particular client device 104, such as a smart phone, table computer, or eBook reader device. In the illustrative implementation shown in FIG. 5, the client device 104 is an eBook reader device.

The page 500 includes text that provides information about Paris, France. In addition, the page 500 is embedded with multimedia content items. For example, the page 500 includes image content items 502-506. The image multimedia content items 502-506 are pictures of locations in Paris, such as the Eiffel Tower (item 502), the Louvre (item 504), and the Arc de Triumphe (item 506).

The page 500 also includes audio content links 508-512. Each of the audio links 508-512 is associated with a respective landmark. For example, selection of the audio link 508 provides audio content related to the Eiffel Tower, selection of the audio link 510 provides audio content related to the Louvre, and selection of the audio link 512 provides audio content related to the Arc de Triumphe. The audio content provided upon selection of the audio links 508-512 may include pronunciation of the name of the respective landmark, facts and history about the respective landmark, or a combination thereof.

The page 500 also includes video content links 514-518. By selecting the links 514-518, video content may be provided via the client device 104. In some instances, the video content may be provided in a window on the display of the client device 104 that is separate from the page 500. In an illustrative example, selection of the link 514 may provide video content of the Eiffel Tower, selection of the link 516 may provide video content of the Louvre, and selection of the link 518 may provide video content of the Arc de Triumphe. The video content provided in response to the selection of the links 514-518 may include an audio/video tour of the respective landmark or a narrated video montage associated with the respective landmark.

Illustrative Methods

Figure 6:
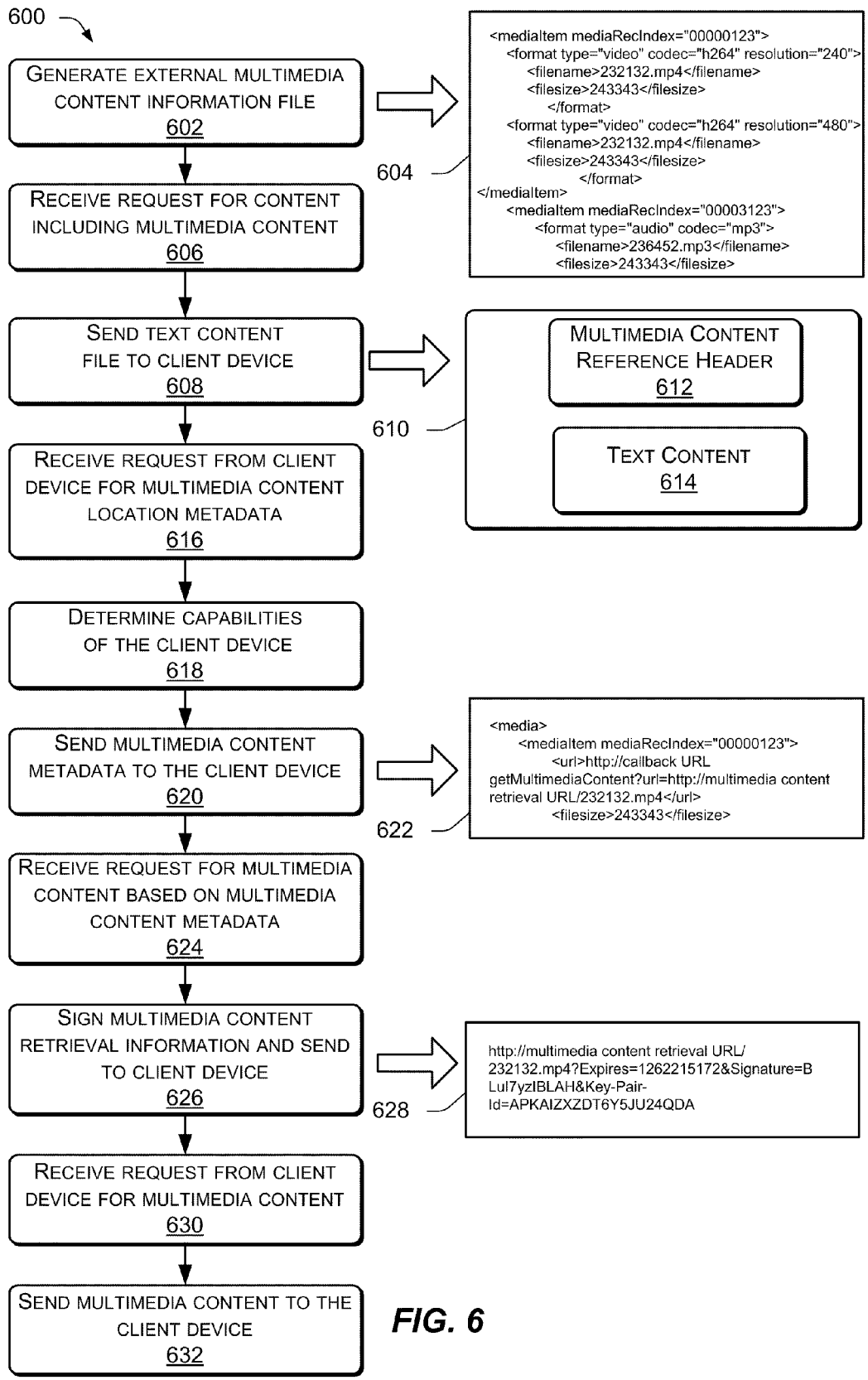
FIG. 6 is a flow diagram of an example process of providing text content embedded with multimedia content to a client device from a content provider.
Figure 7:
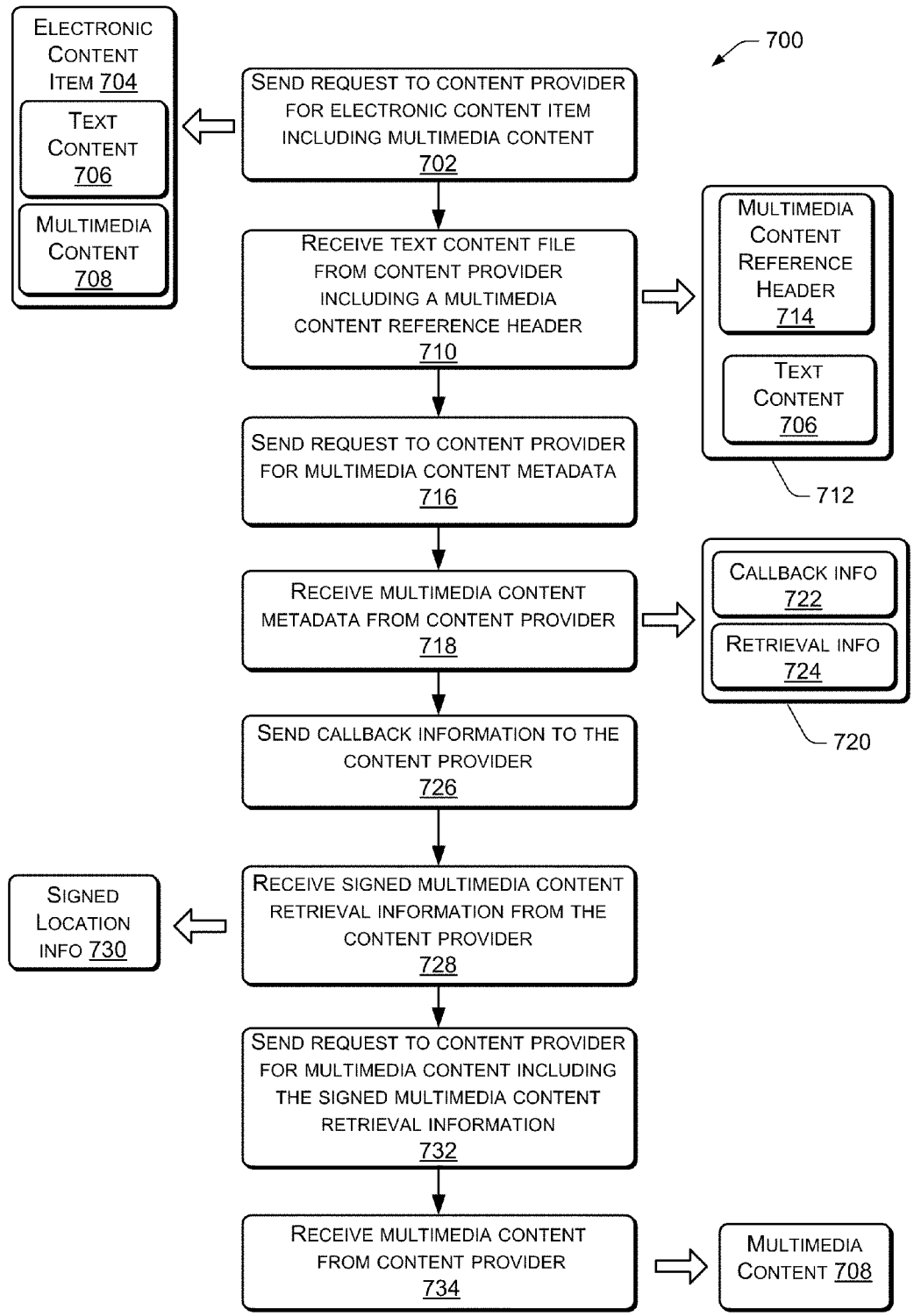
FIG. 7 is a flow diagram of an example process of obtaining text content embedded with multimedia content from a content provider.
Figure 8:
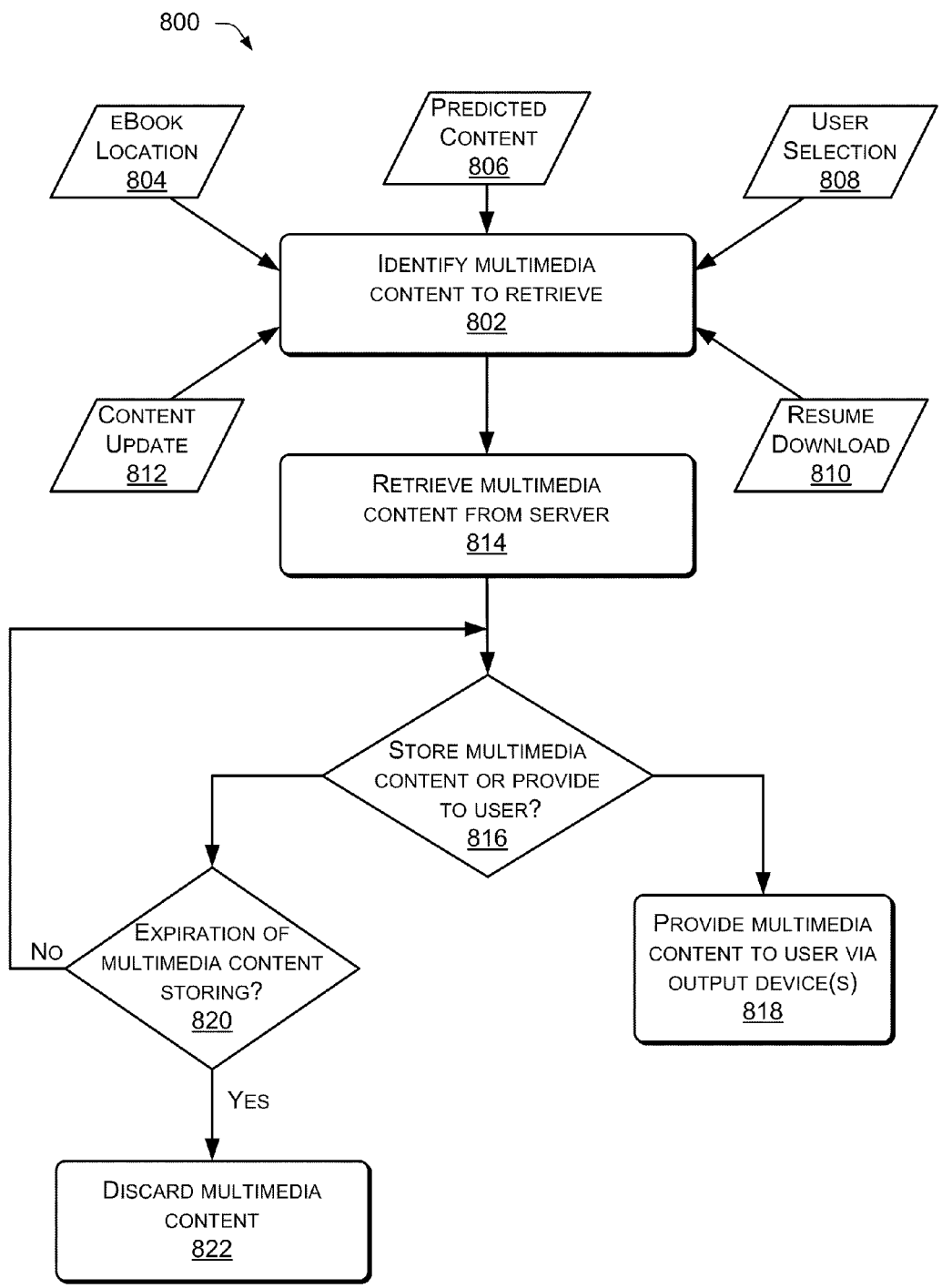
FIG. 8 is a flow diagram of an example process of obtaining specified multimedia content from a content provider and presenting the multimedia content via output devices of a client device.

FIGS. 6-8 show processes 600, 700, and 800, respectively, to provide text content embedded with multimedia content. The processes 600, 700, and 800 are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

FIG. 6 shows a process 600 of providing text content embedded with multimedia content to a client device from a content provider. At 602, a multimedia content information file 604 is generated. The multimedia content information file 604 may be associated with a particular electronic content item that includes text content embedded with multimedia content.

The multimedia content information file 604 may be an XML file that includes information about a number of multimedia content files associated with the particular electronic content item. For example, the multimedia content information file 604 may include data related to a number of video content files encoded via a particular video codec and having a particular resolution. The multimedia content information file 604 may also include a file size for each of the video content files. In another example, the multimedia content information file 604 may include data related to a number of audio content files encoded via a particular audio codec and having a particular file size. In some cases, the audio content files may relate to video content files of the particular electronic content item. Further, the multimedia content information file 604 may include data related to a number of image content files having a particular resolution and a respective file size.

At 606, a request is received at a content provider from a client device for electronic content that includes text content embedded with multimedia content. For example, a content provider may receive a request for an electronic book having image content, audio content, video content, or a combination thereof, embedded within the text content of the electronic book. At 608, the content provider sends a text content file 610 to the client device. The text content file 610 includes a multimedia content reference header 612 and text content 614. The multimedia content reference header 612 indicates that the text content 614 is embedded with multimedia content. The text content 614 may include letters, words, and/or symbols of the requested electronic content item. The text content 614 may also include identifiers associated with multimedia content that are embedded within the text of the electronic item to indicate locations of the multimedia content in the text content 614.

At 616, the content provider receives a request from the client device for multimedia content metadata associated with the electronic content item. In some instances, the request for the multimedia content metadata is based on the multimedia content reference header 612. At 618, the content provider determines the capabilities of the client device and, at 620, the content provider sends the requested multimedia content metadata 622 to the client device based on the capabilities of the client device. In this way, the multimedia content metadata 622 may include information related to multimedia files that are compatible with the capabilities of the client device. For example, the multimedia content metadata 622 may relate to multimedia content files encoded via a particular video codec implemented by the client device, encoded via a particular audio codec implemented by the client device, having a resolution that can be rendered by the client device, or a combination thereof. The multimedia content metadata 622 may include a callback URL and also include a multimedia content retrieval URL in a query string for at least a portion of the multimedia content files of the electronic content item. In some cases, the callback URL can be used to retrieve all of the multimedia content files for an electronic content item, while the multimedia content retrieval URL is specific to one or more particular multimedia content files.

At 624, the content provider receives a request for multimedia content files from the client device. The request for multimedia content files may be directed to obtaining all or a portion of the multimedia content. In addition, the request for the multimedia content files may be based on the callback URL provided to the client device and include at least one multimedia content retrieval URL related to the requested multimedia content files. At 626, the content provider signs the multimedia content retrieval URL(s) and sends the signed multimedia content retrieval URL(s) 628 to the client device. At 630, in response to receiving a signed multimedia content retrieval URL 628 from the client device, the content provider sends the requested multimedia content to the client device.

FIG. 7 shows a process 700 of obtaining, by a client device, text content embedded with multimedia content from a content provider. At 702, a client device sends a request to a content provider for an electronic content item 704 that includes text content 706 embedded with multimedia content 708, such as an electronic book or a web page. At 710, the client device receives a text content file 712 from the content provider including the text content 706 and a multimedia content reference header 714. The multimedia content reference header 714 indicates that the electronic content item 704 includes the multimedia content 708.

At 716, the client device sends a request to the content provider for multimedia content metadata of the electronic content item 704. In some cases, the multimedia content reference header 714 may include an identifier of the electronic content item 704 and the request for the multimedia content metadata may include the identifier of the electronic content item 704. For example, a publisher or a distributor of the electronic content item 704 may assign a particular identifier to the electronic content item 704.

At 718, the client device receives the requested multimedia content metadata. The multimedia content metadata may include multimedia content location metadata 720 to retrieve the multimedia content 708 from the content provider. In some cases, the multimedia content location metadata 720 may include callback information 722, such as a callback URL. Additionally, the multimedia content location metadata 720 may include multimedia content retrieval information 724, such as one or more multimedia content retrieval URLs. At 726, the client device sends the callback information 722 to the content provider. In a particular example, the callback information 722 may be sent along with the multimedia content retrieval information 724. In some instances, the multimedia content retrieval information 724 may be associated with at least a portion of the multimedia content 708 of the electronic content item 704.

At 728, the client device receives signed multimedia content retrieval information 730 from the content provider. At 732, the client device sends a request to the content provider for at least a portion of the multimedia content 708 of the electronic content item 704. The request may include the signed multimedia content retrieval information 730 for at least a portion of the multimedia content 708. At 734, the client device receives the requested multimedia content 708 of the electronic content item 704.

FIG. 8 illustrates an example method 800 of obtaining specified multimedia content from a content provider and presenting the multimedia content via output devices of a client device. At 802, a client device identifies multimedia content files to retrieve from a content provider. At 804, the client device may identify multimedia content files to retrieve based on a current location of a user of the client device in an electronic book. In addition, at 806, the client device may identify multimedia content files to retrieve based on predicted content that a user of the client device may consume. Further, at 808, the client device may identify multimedia content to retrieve according to a user selection of particular multimedia content. For example, the client device may identify multimedia content based on user selection of one or more links rendered on a user interface, such as the links 402, 410, and 412 of FIG. 4 and the links 508-516 of FIG. 5. At 810, the client device may identify multimedia content to retrieve based on resuming a download of multimedia content that was interrupted. Additionally, at 812, the client device may identify multimedia content files to retrieve based on indications received from a content provider that updates to multimedia content associated with electronic items of the user are available.

At 814, the client device retrieves the identified multimedia content from the content provider. For example, the client device may utilize some or all of the method 700 of FIG. 7 in order to retrieve the identified multimedia content files. At 816, the client device determines whether to store the multimedia content files in memory of the client device or to provide the multimedia content files to a user of the client device. When the multimedia content files are to be provided to the user of the client device, the method moves to 818 where the multimedia content is provided to the user of the client device via one or more output devices of the client device. In an illustrative implementation, when the multimedia content files are retrieved in response to user selection of the multimedia content files, then the client device may provide the multimedia content to the user of the client device via one or more output devices of the client device, such as speakers and/or a display. In some cases, the client device may render one or more user interfaces on a display, such as the page 400 of FIG. 4 and the page 500 of FIG. 5, in order to provide the multimedia content. In another illustrative implementation, the multimedia content files may be stored by the client device when the client device predicts that the multimedia content files may be consumed by the user of the client device. When the multimedia content files are to be stored in memory of the client device, the method 800 moves to 820.

At 820, the client device determines whether multimedia content storing has expired for the multimedia content files. For example, the client device may determine whether a license agreement associated with the multimedia content files has expired or whether a user imposed time limit or storage capacity limit has been exceeded. If the storage of the multimedia content files has not expired, the method 800 returns to 816. Otherwise, the multimedia content files are discarded at 822.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
    under control of one or more content provider servers configured with specific executable instructions,
    receiving a request from a client device for an electronic book;
    sending a text content file to the client device in response to receiving the request for the electronic book, the text content file including text content of the electronic book and a multimedia content reference header, the multimedia content reference header indicating that the electronic book includes multimedia content and the multimedia content reference header indicating an identifier of the electronic book;
    receiving a request from the client device for multimedia content metadata, the request for the multimedia content metadata including the identifier of the electronic book;
    generating a multimedia content retrieval uniform resource locator (URL) indicating a storage location of a particular version of multimedia content of a plurality of versions of multimedia content of the electronic book, each version of the multimedia content is capable of being rendered by a client device with a specific set of multimedia content rendering capabilities;
    sending multimedia content metadata to the client device, the multimedia content metadata including a callback URL and a query string including the multimedia content retrieval URL;
    receiving a request from the client device including the callback URL and the query string;
    sending a signed multimedia content retrieval URL to the client device; and
    providing the particular version of the multimedia content to the client device in response to receiving the signed multimedia content retrieval URL from the client device.

2. The computer-implemented method of claim 1, wherein the signed multimedia content retrieval URL expires after a predetermined period of time.

3. The computer-implemented method of claim 1, wherein the particular version of the multimedia content provided to the client device is based on a subscription associated with the client device.

4. The computer-implemented method of claim 1, further comprising sending an indication to the client device that an update of the particular version of the multimedia content is available.

5. The computer-implemented method of claim 4, further comprising:
    receiving a request from the client device for additional multimedia content metadata associated with the update of the particular version of the multimedia content; and
    sending the additional multimedia content metadata to the client device, the additional multimedia content metadata including the callback URL and a query string including an additional multimedia content retrieval URL specifying a storage location of the update of the particular version of the multimedia content.

6. A computer-implemented method, comprising:
under control of a client device configured with specific executable instructions,
sending a first request to a content provider to purchase an electronic book;
receiving text content of the electronic book and an indication that the electronic book includes multimedia content;
obtaining multimedia content metadata from the content provider, the multimedia content metadata indicating a first uniform resource locator (URL) and a second URL;
extracting the second URL from the multimedia content metadata;
generating a second request for the content provider to provide a signed version of the second URL, the second request including the first URL and a query string including the second URL;
receiving, from the content provider, the signed version of the second URL;
sending a third request to the content provider for the multimedia content of the electronic book, the third request including the signed version of the second URL; and
receiving the multimedia content of the electronic book from the content provider.

7. The computer-implemented method of claim 6, wherein the multimedia content of the electronic book includes a plurality of files including one or more audio files, one or more video files, one or more audiovisual files, one or more image files, or a combination thereof.

8. The computer-implemented method of claim 6, wherein the multimedia content metadata includes a file size of the multimedia content of the electronic book.

9. The computer-implemented method of claim 8, further comprising providing an indication of progress of retrieving the multimedia content of the electronic book based on the file size of the multimedia content.

10. The computer-implemented method of claim 6, further comprising:
determining that the client device is incapable of rendering the multimedia content of the electronic book; and
providing the multimedia content of the electronic book to an additional client device that is capable of rendering the multimedia content of the electronic book.

11. A client device comprising:
one or more processors;
memory accessible by the one or more processors, the memory storing one or more modules that include computer-readable instructions executable by the one or more processors to perform acts comprising:
sending a first request to the content provider to purchase an electronic book;
receiving a text content file based at least partly on the first request for the electronic book, the text content file including text content of the electronic book and an indication that the electronic book includes multimedia content;
sending a second request to the content provider for multimedia content metadata at least partly based on the indication that the electronic book includes the multimedia content;
receiving the multimedia content metadata of the electronic book from the content provider, a portion of the multimedia content metadata indicating a storage location of the multimedia content of the electronic book;
generating a third request to the content provider for a signed version of the storage location of the multimedia content;
identifying a portion of the multimedia content of the electronic book to retrieve based on behavior of a user of the client device; and
retrieving the portion of the multimedia content from the content provider based at least partly on the signed version of the storage location of the multimedia content.

12. The client device of claim 11, wherein the acts further comprise sending multimedia content rendering capabilities information of the client device to the content provider.

13. The client device of claim 12, wherein the multimedia content is compatible with the client device according to the multimedia content rendering capabilities of the client device.

14. The client device of claim 11, wherein the acts further comprise identifying the portion of the multimedia content of the electronic book to retrieve by identifying a current page of the electronic book being rendered via the client device.

15. The client device of claim 11, wherein the acts further comprise identifying the portion of the multimedia content of the electronic book to retrieve by predicting subsequent multimedia content items of the electronic book to be consumed via the client device.

16. The client device of claim 11, wherein the acts further comprise identifying the portion of the multimedia content to retrieve based at least partly on receiving an indication of user selection of one or more multimedia content items of the electronic book.

17. The client device of claim 11, wherein the acts further comprise caching the portion of the multimedia content retrieved from the content provider.

18. The client device of claim 11, wherein the acts further comprise presenting the text content and the multimedia content of the electronic book via one or more output devices of the client device.

19. The client device of claim 18, wherein the acts further comprise rendering a user interface including links selectable to provide at least one item of the multimedia content via the one or more output devices of the client device.

* * * * *